United States Patent
Kubo et al.

(10) Patent No.: US 8,406,574 B2
(45) Date of Patent: Mar. 26, 2013

(54) IMAGE PROCESSOR, IMAGE PROCESSING METHOD, AND COMPUTER PROGRAM PRODUCT

(75) Inventors: Satoshi Kubo, Ishikawa (JP); Satoshi Sakai, Ishikawa (JP); Koichi Kitagawa, Ishikawa (JP); Yasunori Taniguchi, Ishikawa (JP); Takayuki Kawanaka, Ishikawa (JP); Kiyoto Kosaka, Ishikawa (JP)

(73) Assignee: PFU Limited (JP)

( * ) Notice: Subject to any disclaimer, the term of this patent is extended or adjusted under 35 U.S.C. 154(b) by 750 days.

(21) Appl. No.: 12/240,573

(22) Filed: Sep. 29, 2008

(65) Prior Publication Data

US 2009/0208141 A1 Aug. 20, 2009

(30) Foreign Application Priority Data

Feb. 20, 2008 (JP) ................. 2008-038744

(51) Int. Cl.
*G06K 9/54* (2006.01)
(52) U.S. Cl. ........ 382/307; 382/321; 382/317; 382/312; 358/401; 358/474; 358/448; 358/403; 715/255; 715/274; 715/273
(58) Field of Classification Search .................. 382/307, 382/321, 317, 312; 358/401, 474, 448, 403; 715/255, 274, 273
See application file for complete search history.

(56) References Cited

U.S. PATENT DOCUMENTS 6,757,081 B1* 6/2004 Fan et al. ...................... 358/474
2003/0133168 A1* 7/2003 Fresk et al. ................... 358/401
2007/0150536 A1* 6/2007 Ahmed et al. ................ 709/203
2008/0252944 A1* 10/2008 Otsuka .......................... 358/474
2009/0108067 A1* 4/2009 Roquemore ............. 235/462.15

FOREIGN PATENT DOCUMENTS

| JP | 11215366 | 8/1999 |
|---|---|---|
| JP | 2001217980 | 8/2001 |
| JP | 2004-112358 | 4/2004 |
| JP | 2006-005766 | 1/2006 |
| JP | 2006-135632 A | 5/2006 |
| JP | 2006-135877 | 5/2006 |
| JP | 2007-312166 | 11/2007 |
| JP | 2007-336143 | 12/2007 |

OTHER PUBLICATIONS

Chinese Office Action for Application No. 2008101700975, issued Sep. 9, 2010.
Japanese Office Action for Application No. JP2008-038744 mailed Feb. 14, 2012.

* cited by examiner

*Primary Examiner* — Mike Rahmjoo
(74) *Attorney, Agent, or Firm* — Lowe Hauptman Ham & Berner, LLP

(57) ABSTRACT

An image processor comprising a control unit, wherein the control unit includes an obtaining unit that obtains image data generated as a result of reading a document by a reader in which a predetermined document reading condition is set; a selecting unit that allows a user to select an use of the image data obtained by the obtaining unit out of a plurality of the uses set in advance; a processing unit that processes the image data obtained by the obtaining unit according to an image processing condition suitable for the use selected by the selecting unit; and a transferring unit that transfers the image data after being processed by the processing unit to an application suitable for the use selected by the selecting unit.

9 Claims, 5 Drawing Sheets

IMAGE PROCESSOR, IMAGE PROCESSING METHOD, AND COMPUTER PROGRAM PRODUCT

RELATED APPLICATIONS

The present application is based on, and claims priority from, Japan Application Number 2008-038744, filed Feb. 20, 2008, the disclosure of which is hereby incorporated by reference herein in its entirety.

BACKGROUND OF THE INVENTION

1. Field of the Invention

The present invention relates to an image processor an image processing method, and computer program product.

2. Description of the Related Art

When reading a document by a reader such as a scanner, a user has to configure a read setting according to an use on the scanner or an application. For example, JP-A-2006-135632 discloses a document management system in which scan setting information is created by designation by the user.

However, the conventional technology makes the user configure the read setting when reading by the scanner, so that there is a problem that the user has to be conscious of a bothersome setting and it is not possible to automatically perform what the user wants to perform.

SUMMARY OF THE INVENTION

It is an object of the present invention to at least partially solve the problems in the conventional technology.

An image processer according to one aspect of the present invention includes a control unit. The control unit includes an obtaining unit that obtains image data generated as a result of reading a document by a reader in which a predetermined document reading condition is set, a selecting unit that allows a user to select an use of the image data obtained by the obtaining unit out of a plurality of the uses set in advance, a processing unit that processes the image data obtained by the obtaining unit according to an image processing condition suitable for the use selected by the selecting unit, and a transferring unit that transfers the image data after being processed by the processing unit to an application suitable for the use selected by the selecting unit.

An image processing method according to another aspect of the present invention is executed by an image processor including a control unit. The method includes an obtaining step of obtaining image data generated as a result of reading a document by a reader in which a predetermined document reading condition is set, a selecting step of allowing a user to select an use of the image data obtained at the obtaining step out of a plurality of the uses set in advance, a processing step of processing the image data obtained at the obtaining step according to an image processing condition suitable for the use selected at the selecting step, and a transferring step of transferring the image data after being processed at the processing step to an application suitable for the use selected at the selecting step.

A computer program product according to still another aspect of the present invention includes a computer readable medium including programmed instructions for image processing. The instructions, when executed by a computer, cause the computer to perform an obtaining step of obtaining image data generated as a result of reading a document by a reader in which a predetermined document reading condition is set, a selecting step of allowing a user to select an use of the image data obtained at the obtaining step out of a plurality of the uses set in advance, a processing step of processing the image data obtained at the obtaining step according to an image processing condition suitable for the use selected at the selecting step, and a transferring step of transferring the image data after being processed at the processing step to an application suitable for the use selected at the selecting step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the image processor, the image processing method, and the computer program product according to the present invention are described below in detail with reference to the accompanying drawings. The embodiments are not to be thus limited.

Configuration of the Embodiment

First, the whole configuration of the image processor 100 according to the embodiment is explained with reference to FIG. 1.

Figure 1:
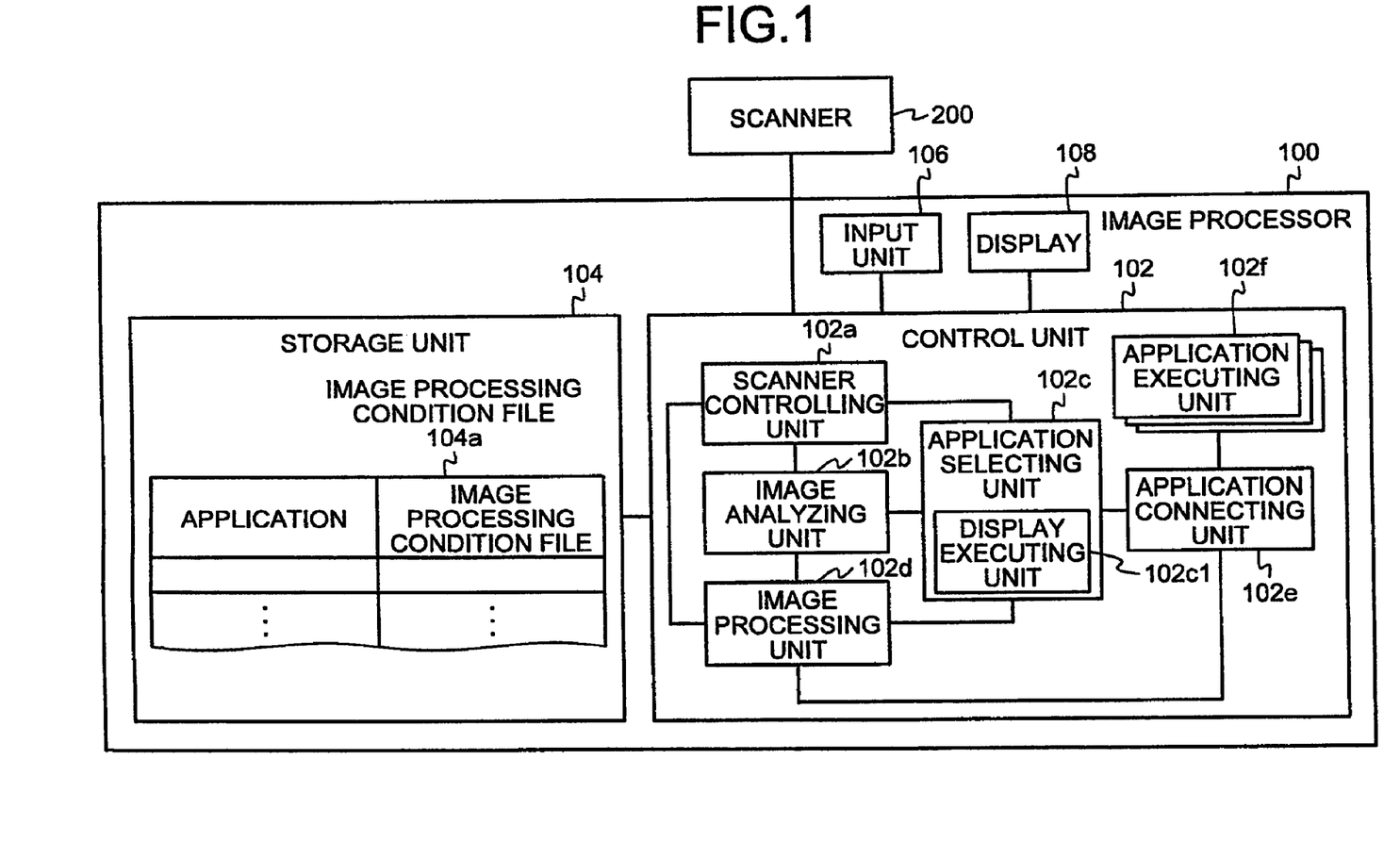
FIG. 1 is a block diagram showing one example of a whole configuration of an image processor 100.

As shown in FIG. 1, the image processor 100 and the scanner 200 are communicatably connected. The image processor 100 is provided with a control unit 102, a storage unit 104, an input unit 106, and a display 108, and the each of them are communicatably connected through an optional communication channel.

The control unit 102 is composed of CPU or the like that integrally controls an entire image processor 100. The control unit 102 includes an internal memory for storing a control program such as an Operating System (OS), a program that defines various procedures or the like, and required data, and performs information processing for executing various processes using such programs. The control unit 102 is provided with a scanner controlling unit 102a, an image analyzing unit 102b, an application selecting unit 102c, an image processing unit 102d, an application connecting unit 102e, and a plurality of an application executing unit 102f in general classification as shown. An information processor (personal computer) communicatably connected to the image processor 100 may include the application executing units 102f. In this case, the application connecting unit 102e may communicate with the application executing units 102f included in the information processor to transfer various pieces of information to the application executing units 102f.

The scanner controlling unit 102a includes an obtaining unit in the present invention. The scanner controlling unit 102a allows the scanner 200 in which a predetermined document reading condition is set to read a document, and obtains image data generated in the scanner 200 as a result of reading from the scanner 200. The scanner controlling unit 102a transfers obtained image data to the image analyzing unit 102b and the image processing unit 102d.

The image analyzing unit 102b corresponds to an analyzing unit in the present invention. The image analyzing unit 102b analyzes the image data transferred from the scanner controlling unit 102a. The image analyzing unit 102b transfers an analytical result to the application selecting unit 102c.

The application selecting unit 102c includes a selecting unit and a limiting unit in the present invention. The application selecting unit 102c allows a user to select an application suitable for an use of the image data obtained by the scanner controlling unit 102a out of a plurality of applications set in advance. The application selecting unit 102c limits the applications selectable by the user out of the applications set in advance, based on the analytical result in the image analyzing unit 102b, and allows the user to select the application suitable for the use of the image data obtained by the scanner controlling unit 102a out of the applications remained as selectable as a result of limitation. The application selecting unit 102c is further provided with a display executing unit 102c1. The display executing unit 102c1 corresponds to a displaying unit in the present invention. The display executing unit 102c1 displays the image data after being processed by the image processing unit 102d on the display 108. The application selecting unit 102c transfers information regarding a selected application and the image data after being processed corresponding to the selected application to the image processing unit 102d and the application connecting unit 102e.

The image processing unit 102d includes a setting unit and a processing unit in the present invention. The image processing unit 102d sets an image processing condition suitable for the application selected by the application selecting unit 102c, and processes the image data transferred from the scanner controlling unit 102a according to the set image processing condition. The image processing unit 102d individually sets the image processing condition suitable for each of the application remained as selectable as a result of limitation by the application selecting unit 102c, and individually processes the image data transferred from the scanner controlling unit 102a according to each of the set image processing condition. The image processing unit 102d transfers the image data after being processed to the application selecting unit 102c (specifically, the display executing unit 102c1) and to the application connecting unit 102e.

The application connecting unit 102e corresponds to a transferring unit in the present application. The application connecting unit 102e transfers the image data after being processed, which is transferred from the image processing unit 102d, to the application executing units 102f that execute the application selected by the application selecting unit 102c, in an appropriate manner.

The application executing units 102f execute a predetermined application using the image data received from the application connecting unit 102e.

The storage unit 104 stores various databases, tables, and files. The storage unit 104 stores an image processing condition file 104a as shown. The image processing condition file 104a associates the application and the image processing condition suitable for the application with each other and stores the same.

The input unit 106 is a monitor or a liquid crystal display that realizes a pointing device function in cooperation with a mouse, as well as a keyboard, the mouse, and a microphone.

The display 108 is the monitor (including a home television), the liquid crystal display, or the like. The display 108 displays an application selection screen for allowing the user to select the application (refer to FIG. 3 to be explained later) by an instruction from the application selecting unit 102c. The display 108 displays the image data after being processed in an image display area of the application selection screen by an instruction from the display executing unit 102c1.

Process of the Embodiment

Then, one example of image processing performed by the image processor 100 is explained with reference to FIGS. 2 to 6.

Figure 2:
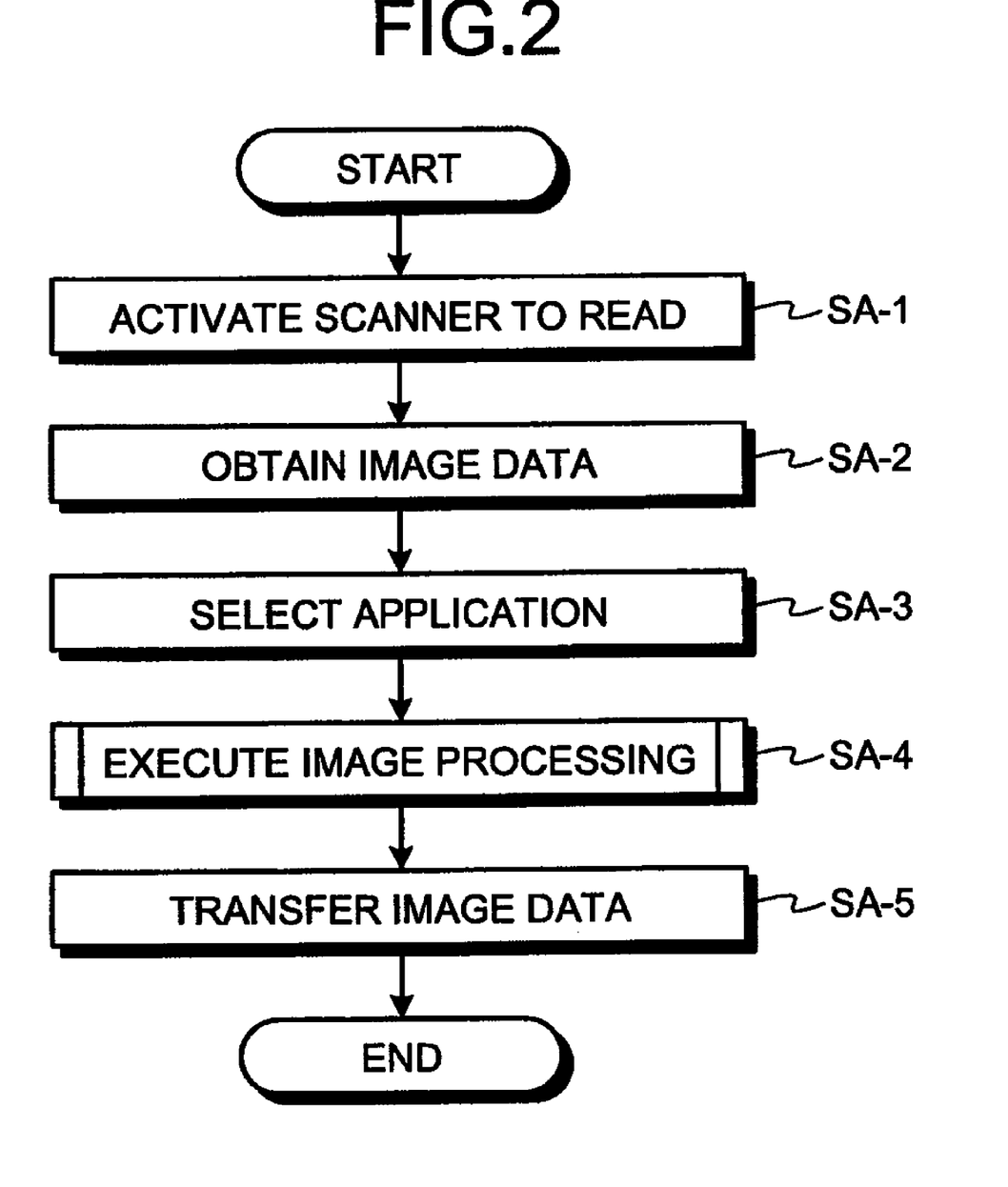
FIG. 2 is a flowchart showing image processing (1) performed by the image processor 100.
Figure 3:
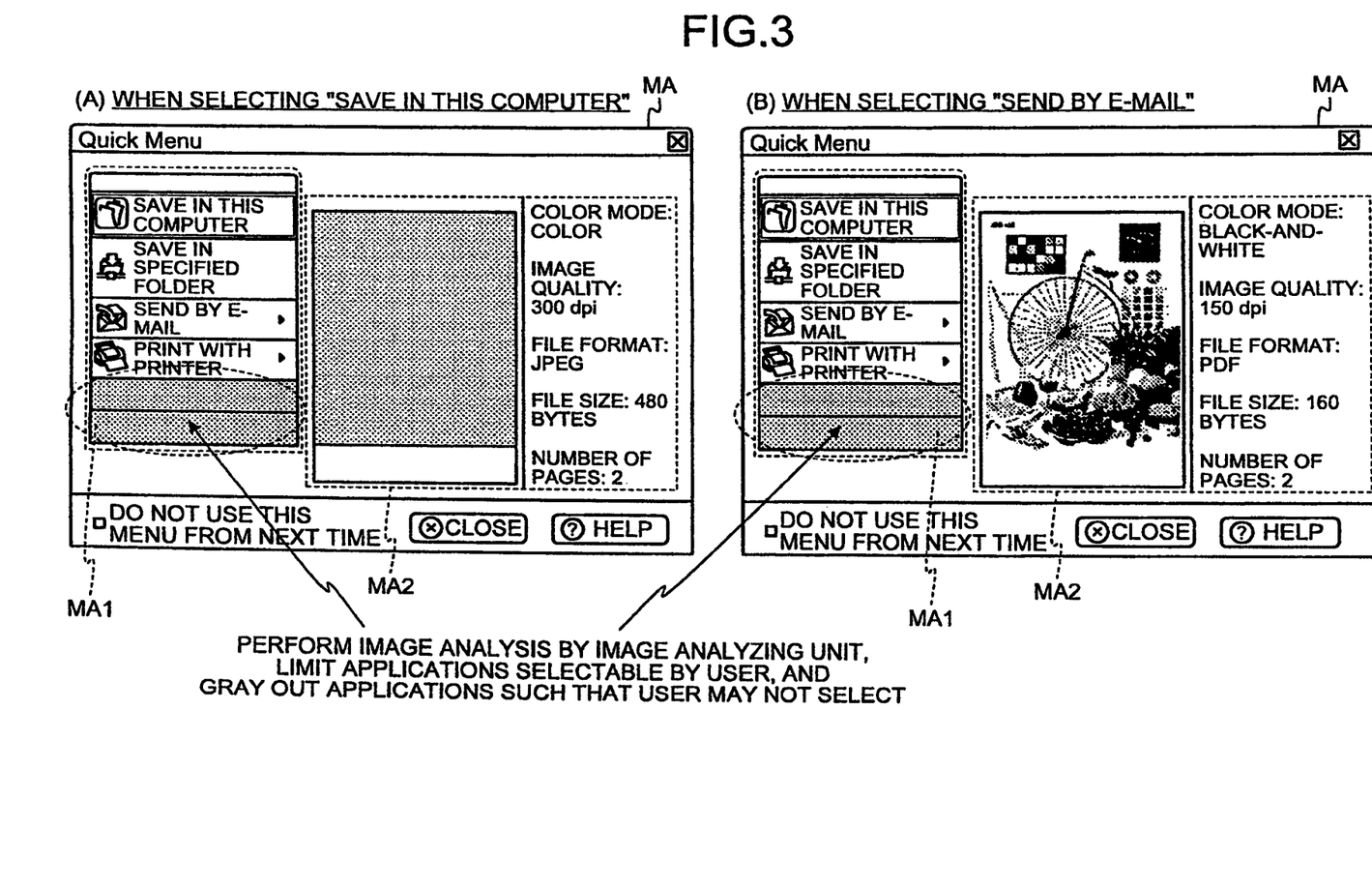
FIG. 3 is a diagram showing one example of an application selection screen MA.
Figure 4:
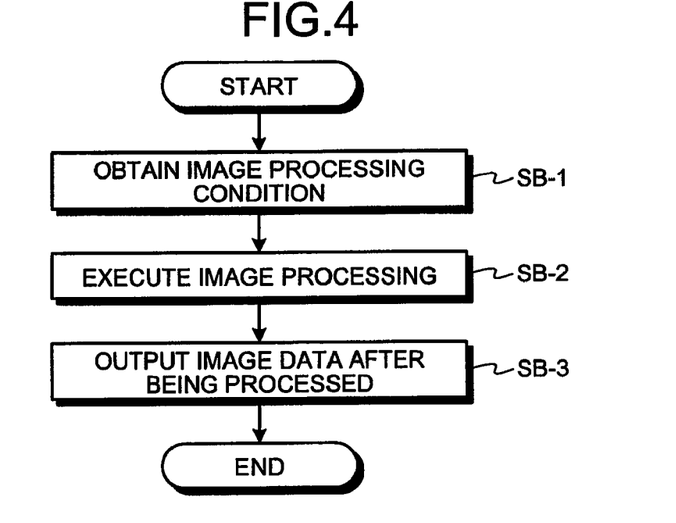
FIG. 4 is a flowchart showing one example of detailed image processing performed by the image processor 100.

First, one example of image processing (1) performed by the image processor 100 is explained with reference to FIGS. 2, 3, and 4.

The scanner controlling unit 102a activates the scanner 200 in which the predetermined document reading condition (reading mode) is set to read (step SA-1). To obtain the image suitable for each of the applications, the reading mode is set to a mode of a large information amount (such as a high-resolution mode and a color mode) in advance. Recently, a high-speed personal computer and scanner are realized, so that high-resolution reading and processing of a high-resolution image may be realized at high speed.

The scanner controlling unit 102a obtains the image data generated by the scanner 200 as a result of reading at the step SA-1 from the scanner 200, and transfers the obtained image data to the image processing unit 102d (step SA-2).

The application selecting unit 102c allows the user to select the application suitable for the use of the image data obtained at the step SA-2 out of the applications set in advance, and transfers the information regarding the selected application to the image processing unit 102d and the application connecting unit 102e (step SA-3). Specifically, the application selecting unit 102c displays an application selection screen MA that selectably displays the applications set in advance (refer to FIG. 3 to be explained later) on the display 108, and allows the user to select the application suitable for the use of the image data out of the applications selectable in an application selection area MA1 of the application selection screen MA, which is displayed, at the input unit 106.

One example of the application selection screen MA is explained with reference to FIG. 3.

The application selection screen MA includes the application selection area MA1 and an image display area MA2. The application selection area MA1 is for selectably displaying information regarding the applications set in advance (such as "save in this computer", "save in the specified folder", "send by e-mail", and "print with the printer"). Thereby, it is possible to allow the user to select the application suitable for the use of the image data out of the applications displayed in the application selection area MA1, at the input unit 106. When the applications are limited by the application selecting unit 102c based on the analytical result obtained by image-analyzing by the image analyzing unit 102b, it is possible to gray out the limited applications (applications, which the user is not allowed to select) as shown, such that the user may not select them in the application selection area MA1. The image display area MA2 is for displaying the image data after being processed by the image processing unit 102d together with the information regarding the image data (such as a color mode, an image quality, a file format, a file size, and the number of pages). Thereby, it is possible to present the image data after being processed and the information regarding the same displayed in the image display area MA2 to the user, before allowing the user to select the application suitable for the use of the image data.

Referring again to FIG. 2, the image processing unit 102d sets the image processing condition suitable for the application transferred from the application selecting unit 102c at the step SA-3 (application selected at the step SA-3), processes the image data transferred from the scanner controlling unit 102a at the step SA-2 according to the set image processing condition, and transfers the image data after being processed to the application connecting unit 102e (step SA-4: detailed image processing).

One example of detailed image processing performed by the image processing unit 102d is explained with reference to FIG. 4.

The image processing unit 102d obtains the image processing condition suitable for the application transferred from the application selecting unit 102c from the image processing condition file 104a stored in the storage unit 104 (step SB-1).

The image processing unit 102d processes the image data transferred from the scanner controlling unit 102a according to the image processing condition obtained at the step SB-1 (step SB-2). Items of image conversion are resolution, color information (such as color, gray, and black-and-white), a paper size, single side/both sides, and the like.

The image processing unit 102d transfers (outputs) the image data after being processed at the step SB-2 to the application connecting unit 102e (step SB-3).

The image processing condition suitable for each of the applications may be changeable according to user setting.

Referring again to FIG. 2, the application connecting unit 102e transfers the image data after being processed, which is transferred from the image processing unit 102d at the step SA-4, to the application executing units 102f that execute the application transferred from the application selecting unit 102c at the step SA-3 (application selected at the step SA-3), in an appropriate manner (step SA-5).

Figure 5:
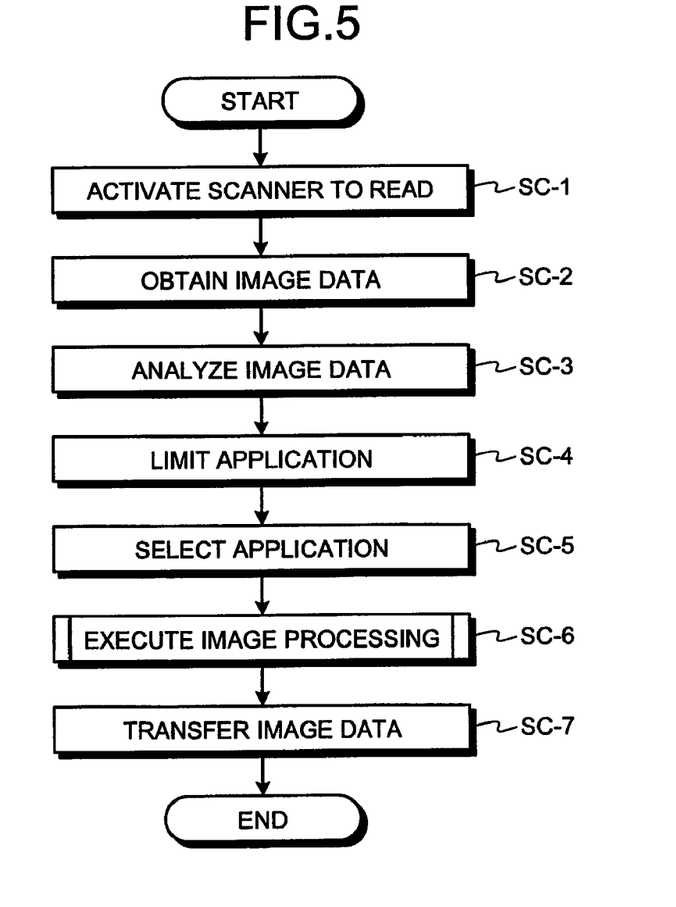
FIG. 5 is a flowchart showing image processing (2) performed by the image processor 100.

Next, one example of image processing (2) performed by the image processor 100 is explained with reference to FIG. 5. The explanation the same as the above explanation is sometimes omitted in the explanation of this process.

The scanner controlling unit 102a activates the scanner 200 in which the predetermined document reading condition (reading mode) is set to read (step SC-1).

The scanner controlling unit 102a obtains the image data generated by the scanner 200 as a result of reading at the step SC-1 from the scanner 200, and transfers the obtained image data to the image analyzing unit 102b and the image processing unit 102d (step SC-2).

The image analyzing unit 102b analyzes the image data transferred from the scanner controlling unit 102a at the step SC-2, and transfers the analytical result to the application selecting unit 102c (step SC-3). The contents to be analyzed are, for example, 1. the color information (such as color, gray, and black-and-white), 2. the paper size, 3. single side/both sides, 4. the number of pages. When there are a plurality of pages to be analyzed, the pages are analyzed by combining the above 1. to 3.

The application selecting unit 102c limits the applications selectable by the user in response to the analytical result transferred from the image analyzing unit 102b at the step SC-3 (step SC-4). Specifically, the application selecting unit 102c limits the applications to be selectably displayed in the application selection area MA1 of the application selection screen MA (refer to FIG. 3) in response to the analytical result.

The application selecting unit 102c allows the user to select the application suitable for the use of the image data obtained at the step SC-2 out of the applications remained as selectable as a result of the limitation at the step SC-4, and transfers the information regarding the selected application to the image processing unit 102d and the application connecting unit 102e (step SC-5). Specifically, the application selecting unit 102c displays the application selection screen MA that selectably displays the applications limited as selectable (refer to FIG. 3) on the display 108, and allows the user to select the application suitable for the use of the image data out of the applications selectable in the application selection area MA1 of the application selection screen MA, which is displayed, at the input unit 106. It is configured that the limited applications are grayed out and are not displayed, as shown in FIG. 3. When the limited applications also are displayed together with the selectable applications, when the limited application is selected by the user, an error message informing this may be displayed thereafter, or the selectable applications and the limited applications may be appropriately sorted so that the user may easily distinguish them.

The image processing unit 102d sets the image processing condition suitable for the application transferred from the application selecting unit 102c at the step SC-5 (application selected at the step SC-5), processes the image data transferred from the scanner controlling unit 102a at the step SC-2 according to the set image processing condition, and transfers the image data after being processed to the application connecting unit 102e (step SC-6: detailed image processing).

The application connecting unit 102e transfers the image data after being processed, which is transferred from the image processing unit 102d at the step SC-6, to the application executing units 102f that execute the application transferred from the application selecting unit 102c at the step SC-5 (application selected at the step SC-5) in an appropriate manner (step SC-7).

Figure 6:
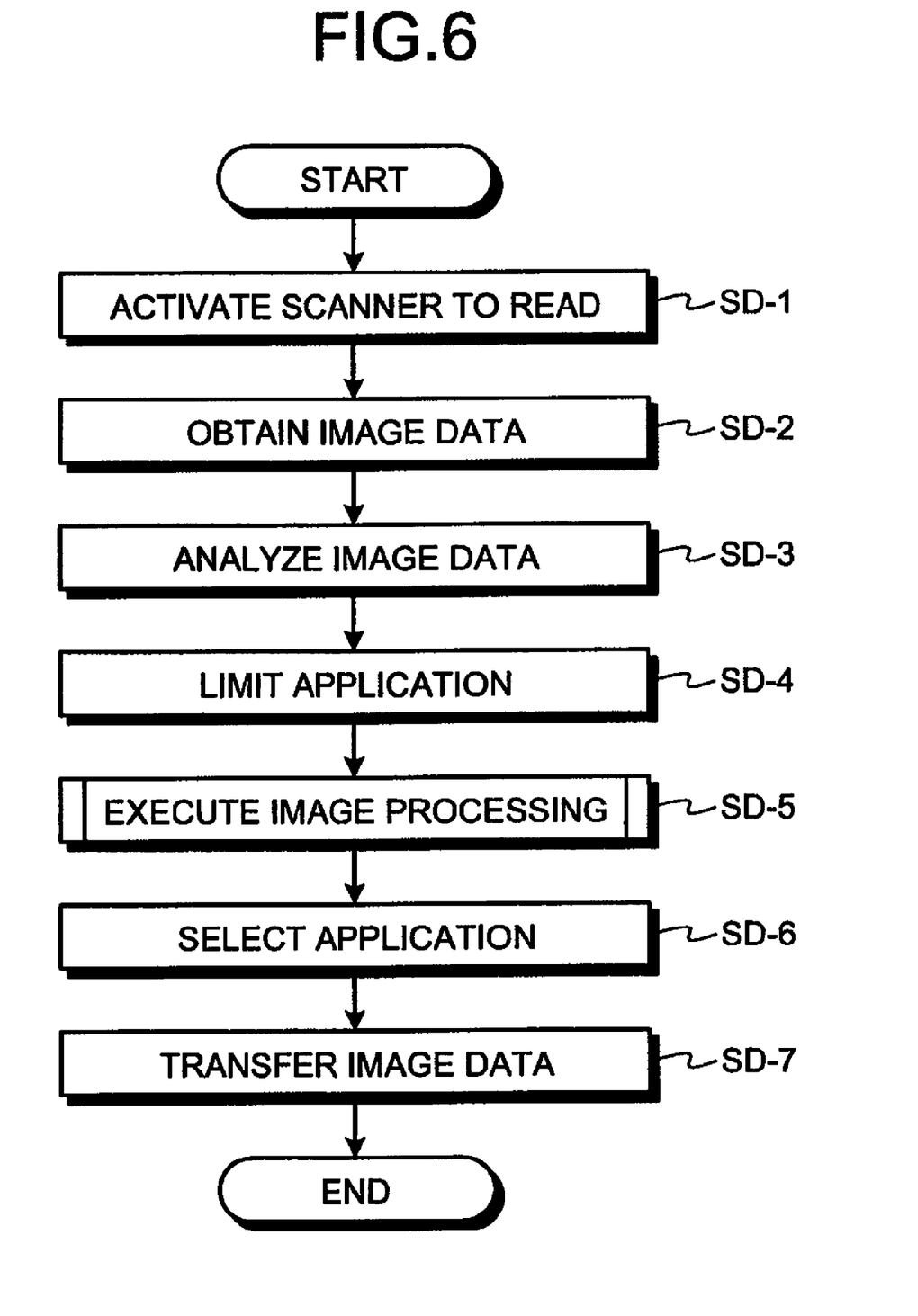
FIG. 6 is a flowchart showing image processing (3) performed by the image processor 100.

Next, one example of image processing (3) performed by the image processor 100 is explained with reference to FIG. 6. The explanation the same as the above explanation is sometimes omitted in the explanation of this process.

The scanner controlling unit 102a activates the scanner 200 in which the predetermined document reading condition (reading mode) is set to read (step SD-1).

The scanner controlling unit 102a obtains the image data generated by the scanner 200 as a result of reading at the step SD-1 from the scanner 200, and transfers the obtained image data to the image analyzing unit 102b and the image processing unit 102d (step SD-2).

The image analyzing unit 102b analyzes the image data transferred from the scanner controlling unit 102a at the step SD-2, and transfers the analytical result to the application selecting unit 102c (step SD-3).

The application selecting unit 102c limits the applications selectable by the user in response to the analytical result transferred from the image analyzing unit 102b at the step SD-3 (step SD-4).

The image processing unit 102d individually sets the image processing condition suitable for each of the applications remained as selectable as a result of limitation at the step SD-4, individually processes the image data transferred from the scanner controlling unit 102a at the step SD-2 according to each of the set image processing condition, and transfers each of the image data after being processed to the application selecting unit 102c (step SD-5: detailed image processing).

By performing a plurality of image processings in this stage, the process after the user selects the application may be performed promptly.

The application selecting unit 102c displays each image data after being processed, which is transferred from the image processing unit 102d at the step SD-5, on the display 108, allows the user to select the application suitable for the use of the image data obtained at the step SD-2 out of the applications remained as selectable as a result of limitation at the step SD-4, and transfers the information regarding the selected application and the image data after being processed corresponding to the selected application to the application connecting unit 102e (step SD-6). Specifically, the application selecting unit 102c displays the application selection screen MA that selectably displays the applications limited as selectable (refer to FIG. 3) on the display 108, and at the same time, displays the image data after being processed and the information regarding the same in the image display area MA2 of the application selection screen MA by the process by the display executing unit 102c1. The application selecting unit 102c allows the user to select the application suitable for the use of the image data out of the selectable applications in the application selection area MA1 of the application selection screen MA, which is displayed, at the input unit 106. Thereby, the user can confirm the image after being processed corresponding to each of the application, before selecting the application.

The application connecting unit 102e transfers the image data after being processed, which is transferred from the image processing unit 102d at the step SD-6, to the application executing units 102f that execute the application transferred from the application selecting unit 102c at the step SD-6 (application selected at the step SD-6) in an appropriate manner (step SC-7).

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, in the embodiment, the image processor 100 performs various processes as a stand-alone device. However, the image processor 100 can be configured to perform processes in response to request from a client terminal, which is a separate unit, and return the process results to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image processor 100 are merely conceptual and may not necessarily physically resemble the structures shown in the drawings. For instance, the apparatus need not necessarily have the structure that is illustrated.

For example, the process functions performed by each device of the image processor 100, especially the each process function performed by the control unit 102, can be entirely or partially realized by a central processing unit (CPU) and a computer program executed by the CPU or by a hardware using wired logic. The computer program, recorded on a recording medium to be described later, can be mechanically read by the image processor 100 as the situation demands. In other words, the storage unit 104 such as read-only memory (ROM) or hard disk (HD) stores the computer program that can work in coordination with the operating system (OS) to issue commands to the CPU and cause the CPU to perform various processes. The computer program is first loaded to the random access memory (RAM), and forms a control unit in collaboration with the CPU.

Alternatively, the computer program can be stored in any application program server connected to the image processor 100 via the network, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 104 is a fixed disk device such as RAM, ROM, and hard disk or flexible disk, optical disk, and stores therein various programs, tables, databases (such as the image processing condition file 104a), and files required for various processes.

The image processor 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

According to the present invention, there is an effect of automatically performing what the user wants to perform without making the user conscious of the bothersome setting.

According to the present invention, it becomes possible to automatically transfer an optimal image to the application suitable for the use. That is to say, it is possible to allow the user to select the use of the image data after reading by the scanner 200.

According to the present invention, there is an effect of making the selection operation of the use (such as the application) by the user more comprehensible.

According to the present invention, there is an effect that the user may confirm an image according to each of the selectable use (such as the selectable application) before the selection operation of the use, and that the process after the selection of the use (such as the application) by the user may be promptly performed.

According to the present invention, there is an effect that the image processing condition suitable for the use is promptly set and freely set.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor, comprising a control unit and a display, wherein the control unit includes
an obtaining unit for obtaining image data generated as a result of reading a document by a reader in which a predetermined document reading condition is set;
an analyzing unit for analyzing the image data obtained by the obtaining unit;
a selecting unit for limiting, based on an analytical result of the obtained image data in the analyzing unit, a plurality of applications set in advance to a smaller set of applications selectable by a user;
a processing unit for individually processing the image data obtained by the obtaining unit according to an image processing condition corresponding to each of the applications remained as selectable as the result of limitation by the selecting unit, wherein the selecting unit is configured to
display, on the display, an application selection screen including (i) an application selection area in which the applications remained as selectable as the result of limitation are displayed and (ii) an image display area in which the image data after being processed by the processing unit is displayed, and
allow the user to select, among the applications displayed in the application selection area, an application for a use of the image data obtained by the obtaining unit; and
a transferring unit for transferring the image data after being processed by the processing unit to the application selected by the user.

2. The image processor according to claim 1, further comprising a storage unit for storing the image processing condition corresponding to each of the applications, wherein
the processing unit further includes a setting unit for obtaining the image processing condition corresponding to the application selected by the user from the storage unit to set the obtained image processing condition as the condition to be adopted when processing the image data, and/or allowing the user to input the image processing condition corresponding to the application selected by the user to set the input image processing condition as the condition to be adopted when processing the image data.

3. The image processor according to claim 1, wherein the selecting unit is configured to (a) sort non-selectable applications and the selectable applications so as to permit the user to distinguish between the non-selectable applications and the selectable applications, and (b) display both the non-selectable applications and the selectable applications, after being sorted, in the application selection area.

4. The image processor according to claim 3, wherein
the selecting unit is further configured to gray out the non-selectable applications, displayed in the application selection area, so as to notify the user of the non-selectable applications.

5. An image processing method executed by an image processor comprising a control unit and a display, wherein the method includes
(i) an obtaining step of obtaining image data generated as a result of reading a document by a reader in which a predetermined document reading condition is set;
(ii) an analyzing step of analyzing the image data obtained at the obtaining step;
(iii) a limiting step of limiting, based on an analytical result of the obtained image data at the analyzing step, a plurality of applications set in advance to a smaller set of applications selectable by a user;
(iv) a processing step of individually processing the image data obtained at the obtaining step according to an image processing condition corresponding to each of the applications remained as selectable as the result of limitation at the limiting step;
(v) a displaying step of displaying, on the display, an application selection screen including (a) an application selection area in which the applications remained as selectable as the result of limitation at the limiting step is displayed and (b) an image display area in which the image data after being processed at the processing step is displayed;
(vi) a selecting step of allowing the user to select, among the applications displayed in the application selection area, an application for a use of the image data obtained at the obtaining step; and
(vii) a transferring step of transferring the image data after being processed at the processing step to the application selected by the user at the selecting step;
wherein the steps (i) to (vii) are executed by the control unit.

6. A computer program product having a non-transitory computer readable medium including programmed instructions for image processing, wherein the instructions, when executed by a computer connected to a display, cause the computer to perform:
an obtaining step of obtaining image data generated as a result of reading a document by a reader in which a predetermined document reading condition is set;
an analyzing step of analyzing the image data obtained at the obtaining step;
a limiting step of limiting, based on an analytical result of the obtained image data at the analyzing step, a plurality of applications set in advance to a smaller set of applications selectable by a user;
a processing step of individually processing the image data obtained at the obtaining step according to an image processing condition corresponding to each of the applications remained as selectable as the result of limitation at the limiting step;
a displaying step of displaying, on the display, an application selection screen including (a) an application selection area in which the applications remained as selectable as the result of limitation at the limiting step is displayed and (b) an image display area in which the image data after being processed at the processing step is displayed;

a selecting step of allowing the user to select, among the applications displayed in the application selection area, an application for a use of the image data obtained at the obtaining step; and a transferring step of transferring the image data after being processed at the processing step to the application selected by the user at the selecting step.

7. An image processor, comprising:

a control unit; and a display, wherein the control unit is configured to obtain image data generated as a result of reading a document by a reader in which a predetermined document reading condition is set, analyze the obtained image data, limit, based on an analytical result of the obtained Image data, a plurality of applications set in advance to a smaller set of applications selectable by a user, individually process the obtained image data according to an image processing condition corresponding to each of the applications remained as selectable as the result of limitation, display, on the display, an application selection screen including (i) an application selection area in which the applications remained as selectable as the result of limitation are displayed and (ii) an image display area in which the image data after being processed is displayed, allow the user to select, among the applications displayed in the application selection area, an application for a use of the obtained image data, and transfer the image data after being processed to the application selected by the user.

8. The image processor according to claim 7, wherein the control unit is configured to (a) sort non-selectable applications and the selectable applications so as to permit the user to distinguish between the non-selectable applications and the selectable applications, and (b) display both the non-selectable applications and the selectable applications, after being sorted, in the application selection area.

9. The image processor according to claim 8, wherein the control unit is further configured to gray out the non-selectable applications, displayed in the application selection area, so as to notify the user of the non-selectable applications.

* * * * *